United States Patent [19]

Lo et al.

[11] 4,453,257

[45] Jun. 5, 1984

[54] SPECTRUM SHAPING MICROWAVE DIGITAL MODULATORS

[75] Inventors: Gerald J. P. Lo; Misel Cuhaci, both of Ottawa; N. S. Hitchcock, Carp, all of Canada

[73] Assignee: Canadian Patents and Development Limited, Ottawa, Canada

[21] Appl. No.: 420,717

[22] Filed: Sep. 21, 1982

[30] Foreign Application Priority Data

Jun. 10, 1982 [CA] Canada ................................. 404854

[51] Int. Cl.³ ............................................. H03C 1/06
[52] U.S. Cl. .................................... 375/60; 375/67; 332/18
[58] Field of Search ............... 375/60, 67; 332/2, 9 R, 332/18, 29 R; 328/162; 455/91, 106, 111

[56] References Cited

U.S. PATENT DOCUMENTS 4,291,277  9/1981  Davis et al. ...................... 375/60 X
4,412,337 10/1983  Bickley et al. ...................... 375/60

Primary Examiner—Robert L. Griffin
Assistant Examiner—Albert W. Watkins
Attorney, Agent, or Firm—Edward E. Pascal

[57] ABSTRACT

This invention is a digital phase modulator for microwave transmitter systems. A digital signal is bandwidth limited at baseband, then is shaped to compensate for the nonlinear reflection coefficient versus bias voltage characteristics in a phase modulator. The shaped signal is applied to the phase modulator to modulate a carrier. The carrier signal is derived from a high power amplifier operating at its maximum power handling capability. Linear multiplication is then obtained, and use of linear intermediate frequency stages, up-converters as well as operation of the high powered amplifier at less than maximum power to obtain linear operation is thus avoided.

12 Claims, 11 Drawing Figures

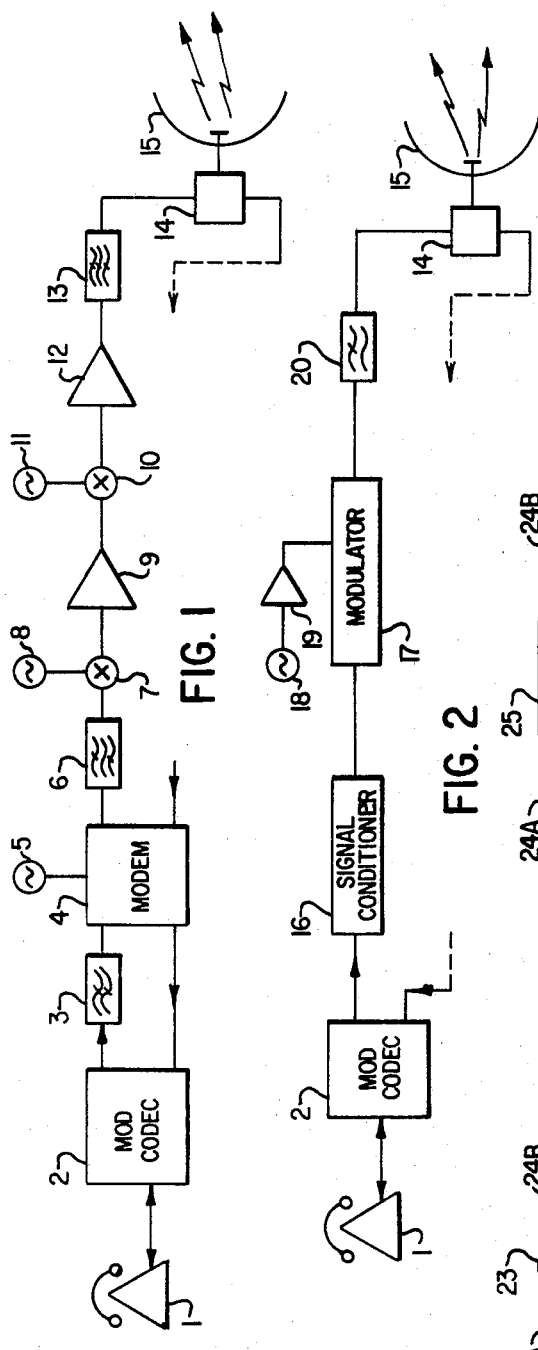

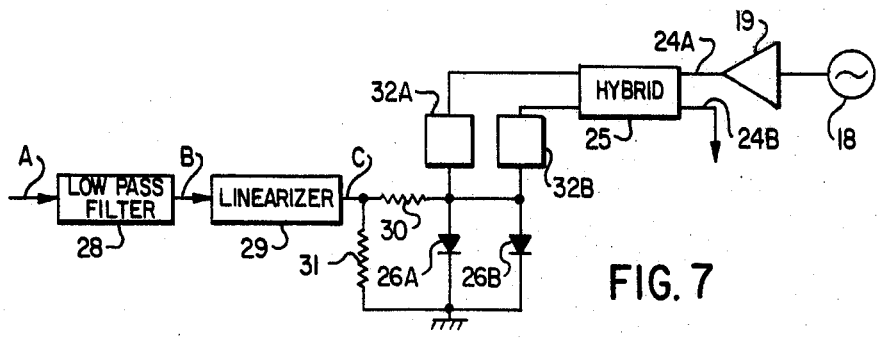
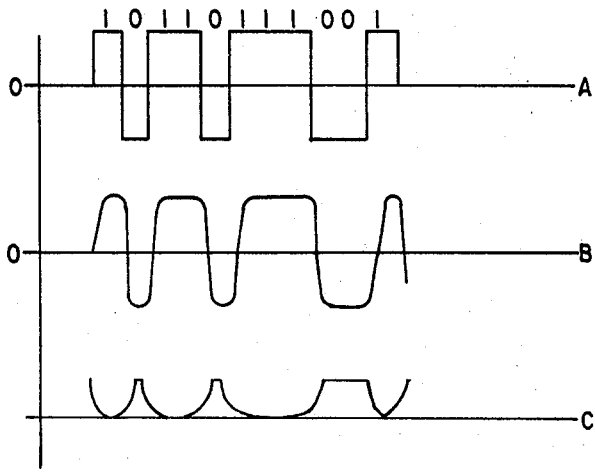
FIG. 8
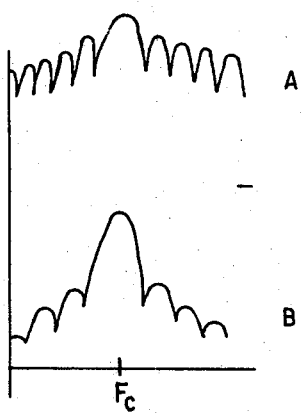
FIG. 9

SPECTRUM SHAPING MICROWAVE DIGITAL MODULATORS

BACKGROUND OF THE INVENTION

This invention relates to microwave communication systems, and particularly to a digital phase modulator for use in the transmitter portion of a microwave communication system.

The formation of a constant envelope type phase modulated digital signal (BPSK or QPSK) for a microwave satellite communication system involves translating a digitally modulated signal through a succession of up converters which are separated by amplifiers and spectrum shaping filters, followed by a high power amplifier and sometimes a microwave bandpass filter, the signal then being transmitted (typically at 6 Gigahertz or 14 Gigahertz) to an earth satellite. As it is very difficult to realize a microwave filter with a bandwidth of less than about 0.1% without excessive filter loss, spectrum shaping for low capacity terminals, (i.e. having a relatively narrow bandwidth, rarely exceeding about 35 kilohertz for each voice circuit), is usually performed just following the first intermediate frequency amplifier, immediately following the modulator, or at baseband. Following spectrum shaping, the signal must pass only through linear components to the antenna. If non-linear components are encountered, additional sidebands are generated, causing interference between adjacent channels.

Since the active components, and particularly the high power amplifier are increasingly non-linear as their power handling capacity is increasingly utilized, the signals passing therethrough must be kept to considerably lower power levels than the high power amplifier would otherwise be able to handle. For example, where a travelling wave tube amplifier is employed as the high power amplifier, it must be used in its linear mode, e.g. typically at 1/5th of its maximum power handling level. Clearly this is wasteful and costly since the equipment is under-utilized.

SUMMARY OF THE INVENTION

According to the present invention, only the unmodulated carrier signal is amplified by a high power amplifier, which operates at power levels approaching or at its maximum power handling capacity. A digital signal to be transmitted is first conditioned, and then is applied to a modulator along with the high power level carrier signal at the frequency to be transmitted. Accordingly the preconditioned digital signal modulates the carrier signal to be transmitted at the transmit frequency, which eliminates the need for linear up-converters, linear intermediate frequency amplifiers, and a linear high power amplifier for amplifying the modulated carrier driving the antenna. The signal conditioner of the present invention, if desired, can incorporate spectrum shaping without linear filtering directly at the carrier frequency. The signal conditioner also shapes the baseband digital signal in a non-linear way to compensate for non-linearities in the high power microwave phase modulator.

The high power amplifier can be driven to saturation, utilizing its maximum power handling capability. Consequently the problem of generating a shaped spectrum output signal to drive the transmitter antenna is considerably simplified and is substantially more economical for a given power level.

In general, the invention is a digital phase modulator for a microwave transmitter comprising a phase modulator, a circuit for applying a microwave carrier signal to the phase modulator through a high powered amplifier at power levels approaching the maximum power handling capacity of the high powered amplifier, a circuit for receiving a digitally encoded signal at baseband, and a circuit for shaping the digitally encoded signal into a waveform having a shape compensating for non-linear distortion in the phase modulator, and for applying the compensating shaped waveform signal to the phase modulator, whereby an effective linear multiplication of the phase signal with the carrier signal is effected at the maximum power level. The digitally encoded baseband signal can be pre-filtered to control the spectrum of the final output signal. The filtering of the digitally encoded baseband signal can also be accomplished within the waveform shaping circuit that is used to compensate for the non-linear distortion in the phase modulator. In the latter case, the waveform shaping circuit needs to be more complex.

As a result, a final output signal in both the frequency and time domain is synthesized, which is identical to one generated by conventional means.

More particularly, the invention is a digital phase modulator for a microwave transmitter comprising a high power amplifier, a circuit for applying a carrier frequency signal to the high power amplifier at about the maximum power handling capability of the amplifier, a PIN diode modulator for receiving an output carrier frequency signal from the high power amplifier, which modulator has a modulation signal voltage input, and a signal conditioning circuit for receiving a baseband digital signal, and for applying a conditioned output signal to the PIN diode modulator modulation signal voltage input. The signal conditioning circuit has a transfer function which is the inverse of the reflection coefficient VS bias voltage transfer function of the PIN diode in the phase modulator.

BRIEF DESCRIPTION OF THE PRIOR ART

It is noted that circuits utilizing preconditioning of a baseband signal to compensate for non-linearities in following circuits is not new as a concept in itself. For example, in U.S. Pat. No. 3,502,987 pulse shaper is used to shape pulses to be transmitted into parabolic form. The parabolically shaped pulses are applied to a PIN diode modulator with a radio frequency carrier signal, the output signal of the modulator being coupled to an output line. A sample of the output signal is used to further modify the parabolically shaped signal in order to reconstitute the parabolically shaped signal which had been modified by non-linearities in the signal carrying circuitry. The result is a gaussian shaped output pulse.

It should be noted that in the aforenoted patent, and in others which use preconditioning, modulation is not effected at the maximum power level; power amplifiers are used between each of the stages. Consequently the already modulated signal must pass through non-linear components prior to transmission or the power amplifiers must be used at substantially less than their maximum power handling capability. Further, the presence of non-linearity in the system is acknowledged in the aforenoted patent by the requirement of the feedback loop which senses the shape of the output signal and modifies the pulse shape.

In contrast to this, the present invention modulates a carrier signal at its maximum power level. Since no following non-linear active circuits are used, spectrum shaping can be completed at baseband, which is a considerably easier task than at intermediate frequency or at carrier frequency.

In the present invention, a reflection type PIN diode phase shift modulator is preferred, although any other type of reflection type phase shift modulator available which suites the requirements of this invention can be used if employed in the circuit using the general principles described in this specification.

INTRODUCTION TO THE DRAWINGS

A better understanding of the invention will be obtained by reference to the description below, in conjunction with the following drawings, in which:

FIG. 1 is a block diagram of a conventional microwave communication system,

FIG. 2 is a general block diagram of a microwave communication system according to the present invention, FIGS. 3A and 3B illustrate two forms of PIN diode modulators, FIG. 4 is a layout of a strip line hybrid which includes impedance matching for the PIN diodes, FIG. 5 is a graph of voltage reflection coefficient vs bias voltage for a pair of matched pin diodes, FIG. 6 is a graph of the transfer function of the linearizer portion of the signal conditioner of FIG. 2, FIG. 7 is a partly block and partly schematic diagram of the modulator and the low pass filter and linearizer portion of the signal conditioner, FIG. 8 shows three waveforms at the input of the low pass filter, the output of the low pass filter, and the output of the linearizer of FIG. 7, FIG. 9 is a spectrum of the output signal of the modulator with a pseudo-random NRZ input signal with and without signal conditioning, and FIG. 10 is a schematic diagram of an embodiment of the signal conditioner portion of the invention.

DETAILED DESCRIPTION

Figure 4:
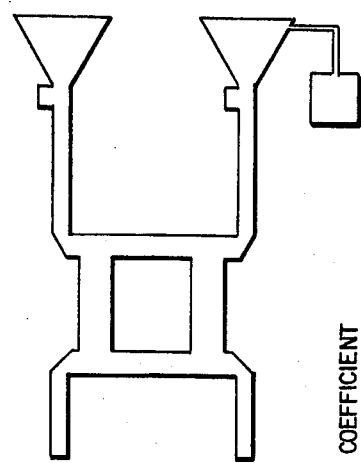

Turning to FIG. 1, a block diagram of a typical prior art signal transmission circuit is shown for modulating and forming a low capacity (single channel per carrier) microwave signal for transmission, e.g. to an earth satellite. A telephone station set 1 is connected to a CODEC (coder/decoder) 2, where the signal is formed into a NRZ (non-return to zero) delta modulated digital signal. This signal is sometimes applied through a spectrum shaping low pass filter 3, and then to a MODEM 4 in conjunction with a signal from a local oscillator 5. The resulting modulated intermediate frequency signal is then passed through a bandpass filter 6, then is applied to a mixer 7 with a signal from a second local oscillator 8. The bandpass filter 6 can be a spectrum shaping filter in the absence of the low pass filter 3. The resulting up-converted signal from mixer 7, at a higher intermediate frequency than previously, is applied through intermediate frequency amplifier 9 to another mixer 10 with the signal from another local oscillator 11. The further up converted signal, now at the carrier frequency is applied to the input of a high power amplifier 12, from which it is applied through a bandpass filter 13 to an antenna coupler 14, from which it is applied to an antenna 15 to be transmitted to an earth satellite or another receiving station.

Received signals from antenna 15 are applied through coupler 14 to receiving circuits (not shown), and then to MODEM 4 where the received signals are demodulated and applied to CODEC 2, where they are decoded to analog signal and applied via the transmission line to station set 1.

In the transmission circuit, it will be noted that three up-converters are used, up-conversion occurring in MODEM 4, mixer 7 and mixer 10. Intermediate frequency amplifiers, e.g. amplifier 9 and high power amplifier 12 both amplify the signal at various stages, and can introduce non-linear distortion. Indeed, high power amplifier 12, if driven at power levels outside of its linear amplification region, introduces distortion which causes unwanted sidebands, interfering with adjacent channels. Consequently high power amplifier 12 must be used at relatively low power levels. For example where a travelling wave tube amplifier has a maximum power handling capacity of 10 watts output, it could only be used to a maximum of 1 watt output, which would be within its linear region.

Consider now FIG. 2, which shows a block diagram of the basic form of the present invention. A station set 1 interfaces with a CODEC 2, where input voice signal is encoded NRZ digital form. The output signal is applied to the input of a signal conditioner 16, from which it is applied to a phase modulator 17. The signal condition preferably is comprised of a spectrum shaping low pass filter and a linearizer. A local oscillator 18 generates a carrier frequency signal and applies it to a high power amplifier 19, such as a travelling wave tube. High power amplifier 19 is driven to its maximum power handling capability, e.g. to saturation. The output signal of high power amplifier 19 is applied to modulator 17, where the signal is modulated by the conditioned NRZ signal. The output signal of modulator 17 is applied through a harmonic rejection filter 20 to antenna coupler 14, from which it is applied to antenna 15.

The received signal path can be similar to the one in the prior art, and is not the subject of the present invention.

A reflection type PIN diode phase shifter is used as modulator 17, which is particuliarly useful for low speed, high power switching between the two phase states. Since the subject terminal is particularly designed for low capacity systems, high speed operation is not of concern. A PIN diode phase modular has a bias voltage input to which the modulation signal is applied. A PIN diode modulator with proper matching exhibits almost perfect resistance, i.e. virtually no reactance, varying between an almost complete open circuit and an almost complete short circuit with variation in bias voltage input signal. Phase modulation is restricted to two states of 0° or 180° as the bias voltage is varied, but the amplitude of the carrier can be changed continuously from zero to full value.

It should be noted that if the change in reflection coefficient of the PIN diode (produced by the radio frequency (R.F.) carrier) is made instantaneous between one extreme (open circuit) and the other (short circuit), an unfiltered bi-phase shift keyed modulated signal with a $(SINx/x)^2$ spectrum is produced. If, however, the change in RF carrier amplitude is made according to a certain time domain waveform derived from the baseband digital bit stream, the RF bi-phase shift keyed modulated signal spectrum can be altered to have suppressed sidebands. It is the function of the signal conditioner 16 to produce a controlled bias voltage to the PIN diode modulator which is derived from the baseband digital bit stream and properly shaped to shape the R.F. spectrum whereby the sidebands will be suppressed to avoid adjacent channel interference.

Two forms of PIN diode modulator circuits suitable for use in this invention are shown in FIGS. 3A and 3B.

In FIG. 3A, PIN diode 21 is connected via a DC blocking capacitor 22 to a circulator 23. The high power RF carrier signal is applied to circulator 23 via signal path 24A, and the modulated signal is output on signal path 24B. The conditioned signal is applied as voltage $V_b$ to the anode of PIN diode 21.

In FIG. 3B a 3 dB quadrature hybrid 25 receives the high power carrier signal on signal path 24A and delivers a modulated signal on path 24B. A pair of PIN diodes 26A and 26B are connected with their cathodes together to RF ground and their anodes through capacitors 27A and 27B respectively to two of the four terminals of hybrid 25. The anodes of PIN diodes 26A and 26B are connected together to a source of conditioned input signal $V_b$.

In both of the modulator circuits of FIGS. 3A and 3B, the signal $V_b$ modifies the reflection coefficient of the PIN diodes, which coefficient is virtually resistive with proper matching. This causes modulation of the signal passing through circulator 23 or hybrid 25. However, the $V_b$ voltage is conditioned in signal conditioner 16 (FIG. 2) so that rather than having merely a square pulse NRZ input waveform, it has a predetermined waveform which causes the modulated signal spectrum to have suppressed sidebands.

It should be noted that conditioning of the signal applied to the PIN diodes is conducted at baseband.

The signal conditioner itself can be configured from two defineable sections, an input filter and a diode linearizer. The input filter can be either an ordinary passive low pass filter designed for signal spectrum shaping or can be an active circuit which simulates the same effects, but which also can incorporate linearization correction for the PIN diode modulator, if desired, It should be noted that the combination of the diode linearizer and modulator can be considered as a single high power linear signal multiplier in which the band limited NRZ signal is linearly multiplied by the RF carrier to produce a final signal for transmission.

Thus the input filtering in signal conditioner 16 performs the band limiting filtering function. The linearizer section of the signal conditioner 16 linearizes the reflection coefficient variation with respect to input bias voltage $V_b$ of the PIN diodes.

In order to improve the power handling characteristic of the modulator, the circuit of FIG. 3B was preferred in formation of an operating prototype. However in place of each capacitor 27A and 27B an impedance matching circuit was used, according to well known practice.

In FIG. 4, a microstrip hybrid 25 is shown which can be used as the hybrid and impedance matching circuit for the PIN diodes. In the aforenoted prototype, the stripline was fabricated on 0.020 inch thick RT/DUROID 5880 type substrate, and had a center frequency of 6 Gigahertz. Other realizations of the hybrid are possible, e.g. TEM stripline or waveguide.

Figure 5:
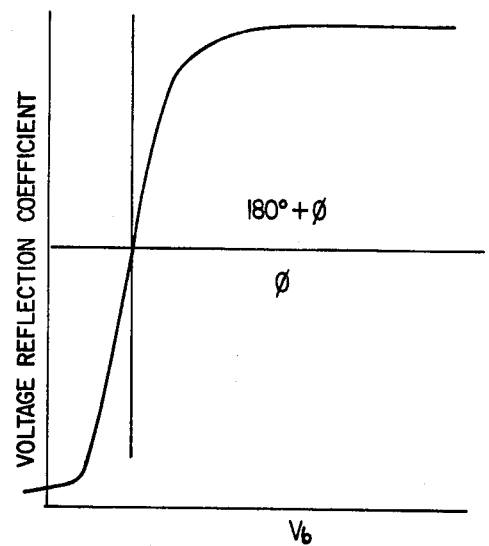
Figure 6:
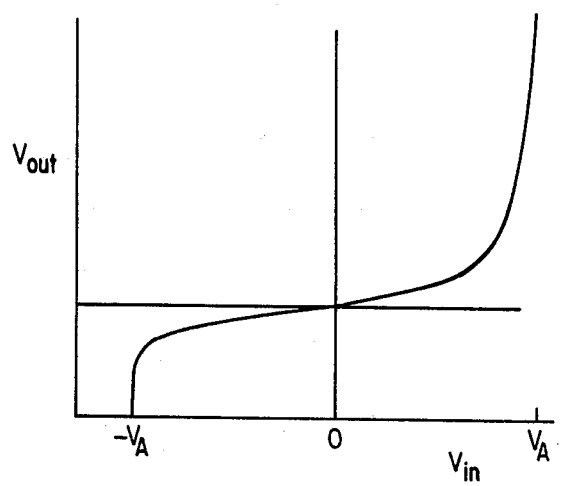

To improve loading for the bias drive circuit, a series resistor of 33 ohms and a shunt resistor of 100 ohms was added to the modulator's bias input $V_b$ (see FIG. 7). The resulting characteristic of the voltage reflection coefficient against bias voltage for a pair of matched PIN diodes is shown in FIG. 5. It may be seen that the voltage reflection coefficient is quite nonlinear with applied voltage. It is necessary to linearize the characteristic in order to obtain a "linear" modulator. The linearization transfer function which is provided in signal conditioner 16 is shown in FIG. 6. This linearization transfer function is an inverse of the function shown in FIG. 5. The input voltage $V_{in}$ must be limited to $\pm V_A$ so that the output voltage follows the required transfer function. The output voltage $V_{out}$ is of course applied to the bi-phase modulator as the bias voltage $V_b$.

A more detailed block diagram of the invention is shown in FIG. 7. A hybrid 25 has one port (24A) connected to the output of high power amplifier 19, which has a carrier frequency signal from oscillator 18 applied thereto. The output path 24B from hybrid 25 carries the output signal, to be applied via a combiner to an antenna.

An NRZ form of digital signal is applied to a low pass filter 28, which defines the final spectral shape of the resulting output signal on transmission path 24B. The output signal from low pass filter 28 is applied to linearizer 29, which has a transfer function $V_{out}/V_{in}$ according to FIG. 6. The input signal to linearizer 29 has limits $\pm V_A$.

The output signal of linearizer 29 is applied to a matched pair of PIN diodes 26A and 26B via a loading network comprised of series resistor 30 and shunt resistor 31. As noted above, in one successful prototype resistor 30 was 33 ohms and resistor 31 was 100 ohms. Each PIN diode was type MA-4P303.

The anodes of the pair of PIN diodes are respectively connected to a hybrid via PIN diode matching circuits as in FIG. 4. The matching circuits are shown schematically in FIG. 7 as blocks 32A and 32B.

The signal at the input of low pass filter 28, point A, is the well known NRZ form of signal shown in FIG. 8, waveform A. At the output of low pass filter 28, at point B, is observed the band-limited signal waveform shown in FIG. 8, waveform B. However, following linearization, at point C of FIG. 7 the signal waveform shown in FIG. 8, waveform C is observed.

FIG. 9 shows the spectrum of modulator output 24B, using a pseudo-random NRZ waveform as the input. Spectrum A shows the spectrum without band-limiting and diode linearization, and spectrum B shows the spectrum with band-limiting and diode linearization. The signal in spectrum B clearly has its sidebands reduced due to filtering.

The linear modulator accepts any kind of filtered NRZ baseband digital waveform at its input and multiplies it linearly with the RF carrier. Thus any equivalent shaped spectrum can be synthesized with the described linearized modulator.

Figure 10:
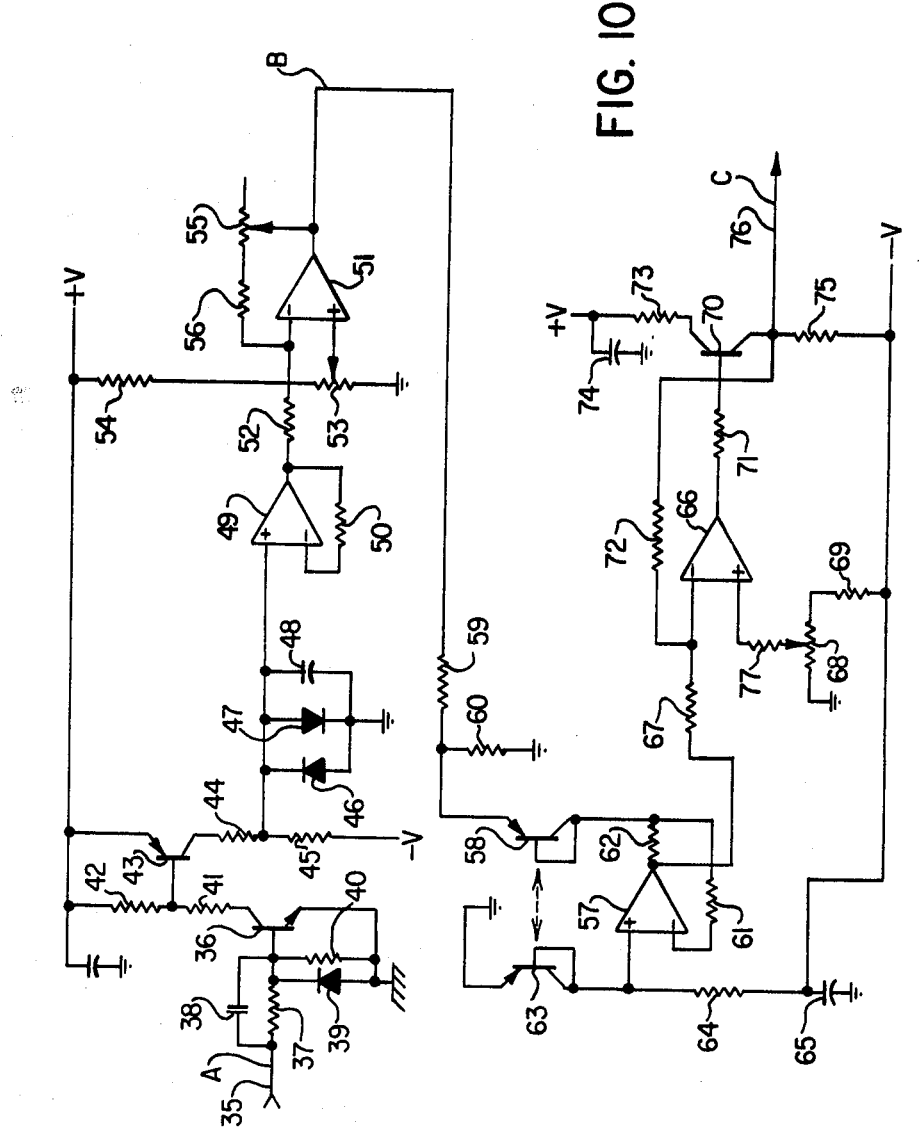

FIG. 10 is a schematic of a linearizer and low pass filter which can be used as elements 28 and 29 respectively shown in FIG. 7. These circuits generate a portion of the transfer function shown in FIG. 6 sufficient to demonstrate the utility of the invention.

The NRZ input signal is applied to input signal path 35 and reaches the base of transistor 36 through resistor 37 and capacitor 38 in parallel. The signal is limited by the base-emitter junction of transistor 36 and diode 39 connected in parallel therewith in opposite polarity. Base bias is provided through resistor 40 in parallel with diode 39, which is also connected to the system ground.

The collector of transistor 36 is connected to a source of voltage +V through series resistors 41 and 42. The input signal is applied through resistor 41 to the base of transistor 43. The emitter of transistor 43 is connected to voltage source +V and its collector is connected to a voltage source −V through resistors 44 and 45. The output signal of transistor 43, passing through resistor 44 is applied to parallel opposite polarity diodes 46 and 47, which serve to again limit the signal to constant amplitude. Filtering capacitor 48 in parallel with the diodes performs the function of band limiting, thus changing the NRZ square wave into a trapezoidal waveform. In an operating prototype circuit, capacitor 48 had the value of 0.068 microfarads, for a maximum 50 kilohertz digital input pulse rate.

The filtered signal is passed through a buffer 49, which has a resistor 50 connected between its output and its inverting input. The output signal from buffer 49 is applied to the inverting input of an operational amplifier 51 through resistor 52. The non-inverting input of amplifier 51 is connected to the tap of a potentiometer 53 which is connected between ground and voltage source +V through resistor 54. The output of operational amplifier 51 is connected to its inverting input through potentiometer 55 in series with resistor 56.

The slope of the transfer function is established by potentiometer 53. The gain of operational amplifier 51, and thus the amplitude of the output is set by potentiometer 55. Thus the output signal of operational amplifier 51 is band limited and constant and controlled amplitude.

The output signal of operational amplifier 51 is applied to operational amplifier 57 through resistor 59 and base-collector shorted transistor 58. Resistor 59 is connected to the emitter of transistor 58, which emitter is returned to ground through resistor 60. The collector of transistor 58 is connected to the inverting input of operational amplifier 57 through resistor 61, and to the output of operational amplifier 57 through resistor 62.

A second transistor 63, which is matched and similar to transistor 58 has its collector shorted to its base, and its emitter connected to ground. Its collector is connected to the non-inverting input of operational amplifier 57 and through resistor 64 to the negative voltage source −V which in turn is connected to ground through bypass capacitor 65. Transistors 58 and 63 are thermally connected together. Consequently as transistor 58 heats up under the influence of signals passing therethrough or due to ambient temperature changes, and its operating point changes; transistor 63 similarly changes. Consequently the offset point of operational amplifier 57 remains stable, due to similar changes in the DC point connected to both of its input terminals.

The output signal of operational amplifier 57 is applied to the inverting input of operational amplifier 66 through resistor 67. The DC offset of operational amplifier 66 is adjusted by its non-inverting input being connected via resistor 77 to the tap of potentiometer 68 which is connected between ground and voltage source −V through resistor 69.

The output of operational amplifier 66 is connected to the base of transistor 70 through resistor 71, while the emitter of transistor 71 is connected to the inverting input of operational amplifier 66 through resistor 72. The collector of transistor 70 is connected to voltage point +V through resistor 73 (the voltage point being bypassed to ground through capacitor 74) and the emitter of transistor 70 is connected to voltage source −V through resistor 75. The shaped output signal is obtained on output signal path 76, which is applied to the PIN diode modulator, e.g. via resistor 30 in FIG. 7.

The input signal path 35 corresponds with point A in FIG. 7, the input signal applied thereto being of the waveform A in FIG. 8. Waveform B in FIG. 8 is observed at point B in both of FIGS. 7 and 10. Waveform C in FIG. 8 is observed at point C in FIG. 7 and at the output, point C of FIG. 10. As explained earlier, however, the signal shaper portion of FIG. 10 only approximates the transfer function shown in FIG. 6, rather than being exact. However, it is sufficiently close to satisfy the requirements of the invention.

The present invention has been shown to lower the cost of microwave equipment for microwave transmission systems by eliminating up-conversion equipment, since modulation of the full power carrier signal is utilized. The nonlinearities in the high power amplifier are not of concern, allowing such amplifiers to be operated at virtually their maximum power handling capability, thus reducing the cost of high power amplifiers used to generate a given output power level.

A person skilled in the art understanding the present invention may now conceive of variations in design or other embodiments, using the same or similar principles. All are considered to be within the sphere and scope of this invention as defined in the claims appended hereto.

We claim:

1. A digital phase modulator for a microwave transmitter comprising:
   (a) a phase modulator,
   (b) means for applying a microwave carrier signal to the phase modulator through a high power amplifier at power levels approaching the maximum power handling capacity of the high powered amplifier,
   (c) means for receiving a band limited NRZ signal at baseband,
   (d) means for shaping the NRZ signal waveform into a modulation waveform signal having shape compensating for non-linear reflection distortion in the phase modulator, and for applying the compensating waveform signal to the phase modulator, whereby an effective linear multiplication of the band limited baseband and the carrier signal is obtained at said high power levels to provide a high power modulated carrier output signal.

2. A digital phase modulator for a microwave transmitter comprising:
   (a) a PIN diode phase modulator, including a bias voltage input terminal for receiving a modulating signal,
   (b) means for applying a microwave carrier signal to the phase modulator at power levels approaching the maximum power handling capacity thereof,
   (c) means for receiving an NRZ binary signal at baseband,
   (d) means for band limiting the NRZ binary signal at baseband, and
   (e) means for shaping the band limited NRZ binary signal to a form compensating for the reflection coefficient variation of the PIN diode modulator with respect to said bias voltage whereby a synthetic linear multiplication of the NRZ binary signal with the carrier signal is obtained to provide a high power modulated carrier output signal.

3. A digital phase modulator as defined in claim 2, in which the PIN diode phase modulator is in the form of a reflection type phase shifter.

4. A digital phase modulator as defined in claim 3, in which the band limiting and shaping means is comprised respectively of a low pass filter and a linearizer circuit having an output voltage with respect to input voltage transfer function which is the inverse of the reflection coefficient with respect to bias voltage transfer function of one or more PIN diodes in said phase modulator.

5. A digital phase modulator for a microwave transmitter comprising:
 (a) a high power amplifier,
 (b) means for applying a carrier frequency signal to the high power amplifier power at about the maximum power handling capability level of the amplifier,
 (c) a PIN diode modulator for receiving an output carrier frequency signal from the high power amplifier, the modulator having a modulation signal bias voltage input,
 (d) signal conditioning means for receiving an NRZ digital signal, for band and amplitude limiting it at baseband, and for applying a conditioned output signal to the PIN diode modulator modulation signal bias voltage input,
 (e) said signal conditioning means including means for translating the band and amplitude limited signal through a transfer function which is the inverse of the reflection coefficient with respect to bias voltage transfer function of the PIN diode in said phase modulator.

6. A digital phase modulator as defined in claim 5 in which the PIN diode modulator is comprised of a quadrature hybrid having an input for receiving the carrier signal, an output for providing a modulated output signal, and a further pair of inputs each connected via an impedance matching means to at least one PIN diode, and means for applying the conditioned signal to each of the diodes.

7. A digital phase modulator as defined in claim 5 in which the PIN diode modulator is comprised of a circulator having an input for receiving the carrier signal, an output for providing a modulated output signal, and a modulating signal input connected through an impedance matching means to a PIN diode of said modulator, and means for applying the conditioned signal to the diode.

8. A linear phase modulator comprising means for limiting the R.F. bandwidth of a digital phase modulated signal which is to be transmitted, a phase modulator means including means for directly modulating a carrier signal at maximum power level, and means for translating the bandwidth limited baseband signal and applying the translated signal to the modulator for modulation of the carrier signal, the translating means having a transfer function which is the inverse of the non-linear phase switching characteristic of the modulator.

9. A method of generating a phase modulated microwave signal comprising:
 (a) low pass filtering an NRZ digital baseband signal which is to be transmitted,
 (b) applying the filtered NRZ baseband signal through a linearizing circuit to the bias input of a PIN diode modulator,
 (c) subjecting the filtered signal to a transfer function in the linearizing circuit which is the inverse of the reflection coefficient with respect to bias voltage transfer function of the PIN diode modulator,
 (d) applying a microwave carrier signal through an output power amplifier at about the maximum power handling capability level of the power amplifier to the modulator for modulation thereof by the signal which is output from the linearizing circuit,
whereby a band limited modulated microwave output signal is obtained from the modulator.

10. A method of generating a digital phase modulated microwave signal comprising limiting the baseband bandwidth of an encoded NRZ signal which is to be transmitted, conditioning the signal, and applying the conditioned signal to a phase modulator to which a microwave carrier signal is applied at full power to be transmitted, the signal being conditioned by translating it via a transfer function which is the inverse of the non-linear reflection characteristic of the modulator.

11. A method as defined in claim 10 including the step of amplitude limiting the NRZ signal prior to translating it via said transfer function.

12. A method as defined in claim 11 including applying the translated signal to a quadrature hybrid type PIN diode phase modulator, said transfer function being the inverse of the reflection coefficient with respect to bias voltage characteristic of the phase modulator.

* * * * *